(No Model.)
2 Sheets—Sheet 1.

R. B. DAVY.
WAVE MOTOR.

No. 418,943.   Patented Jan. 7, 1890.

WITNESSES:
Fred G. Dieterich
Jos. A. Ryan

INVENTOR
Robert B Davy
BY Munn &Co
ATTORNEY (No Model.) 2 Sheets—Sheet 2.

R. B. DAVY.
WAVE MOTOR.

No. 418,943. Patented Jan. 7, 1890.

WITNESSES:
Fred G. Dieterich
Jos. A. Ryan

INVENTOR
Robert B. Davy
BY
ATTORNEY

UNITED STATES PATENT OFFICE.

ROBERT BALLARD DAVY, OF SAN DIEGO, CALIFORNIA.

WAVE-MOTOR.

SPECIFICATION forming part of Letters Patent No. 418,943, dated January 7, 1890.

Application filed April 15, 1889. Serial No. 307,371. (No model.)

*To all whom it may concern:*

Be it known that I, ROBERT BALLARD DAVY, residing at San Diego, in the county of San Diego and State of California, have invented certain new and useful Improvements in Wave-Motors, of which the following is a specification.

My invention relates to means for utilizing the power of waves on the surface of any natural body of water for the purpose of running machinery; and it has for its object to provide a suitably-arranged float or buoy, fixed in such a manner as to vibrate on the surface of the water within a limit of ninety degrees.

It has also for its object to provide suitable mechanism, which is connected with the said float, which will retain the same in its desired position, and also utilize the said vibratory movements, so as to convey a continuous running movement to a drive-shaft located on shore.

To this end my invention consists in certain novel features of construction and peculiar combination of parts, all of which will be fully described in the annexed specification, and particularly pointed out in the claims, reference being had to the accompanying drawings, in which—

Figure 1:
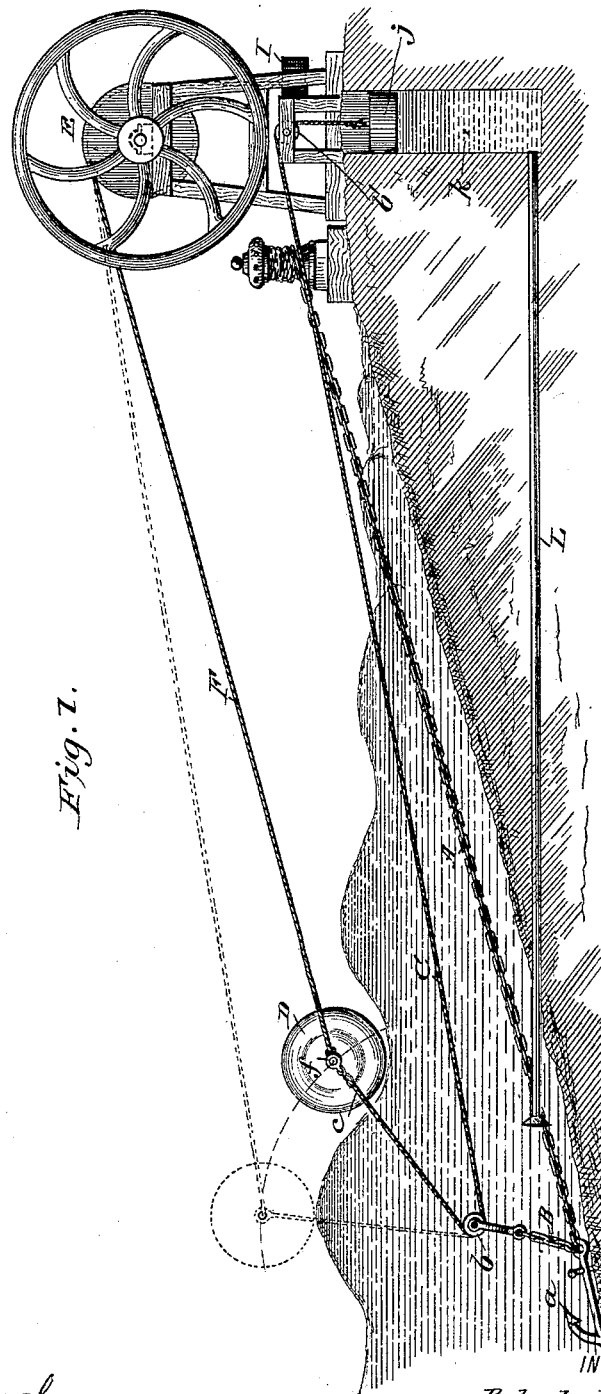
Figure 2:
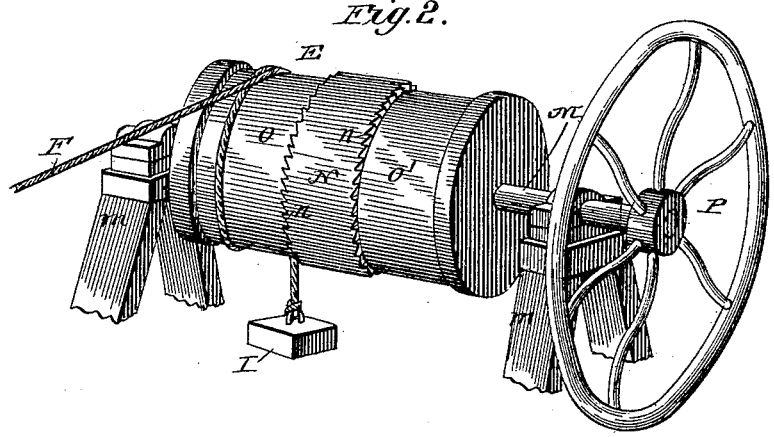
Figure 3:
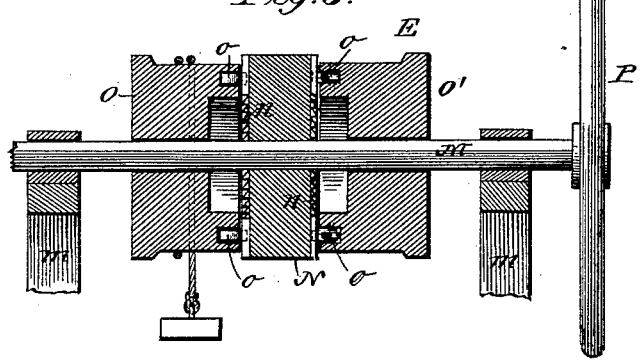
Figure 5:
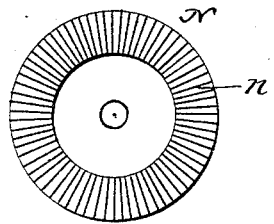
Figure 4:
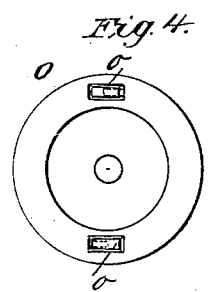
Figure 6:
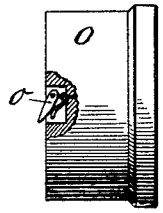

Figure 1 is a view illustrating my improvement as in operation. Fig. 2 is a perspective view of the windlass. Fig. 3 is a longitudinal section of the same. Fig. 4 is an end view of one of the loose drums, and Fig. 5 is an end view of the fixed drum. Fig. 6 is a side view of one of the loose drums.

In the practical application of my invention I employ a float which is intended to act on the surface of any body of water where waves exist; but it is more especially adapted for use on the ocean near the beach where the waves are high and continuous. In arranging the same in position I provide a chain A, connected at one end to a capstan located on shore, and provided with an anchor $a$ at its other end, which is extended out some distance into the water and engages with the bottom, by means of which the chain may be held taut when drawn up on the capstan.

To the chain A, near the anchor, is linked or otherwise secured a short chain B, which has secured at its free end a pulley $b$.

C denotes a cable, which is attached at its outer end to the float D, passed under the pulley $b$, and extended to the shore, where it passes over a pulley $b'$, journaled to any suitable standard, and has secured upon its depending free end a weight $j$, that floats in a well K, in which the water rises and falls with the tide, in a manner and for the purpose presently explained. The float D, which may be of cylindrical or other shape, is connected to the windlass E, which is shown in detail, Figs. 2 and 3, by means of the cable F, which is secured at its outer end to a suitable bail $f$ on the float, its inner end passed over a loose drum on the windlass-shaft, and provided with a weight I, as shown.

By arranging the float as described it will be observed that its action depends, mainly, on the displacement of the water by a lighter body. As the waves roll toward the shore the float describes the arc of a circle with the pulley $b$ as a center, and the outer end $c$ of the cable C as a radius. In other words, the float D glides backward and forward over the waves, producing, with the cable F and the weight I, a backward-and-forward motion of the loose drum, which imparts a continuous motion to the drive-shaft of the windlass, in a manner presently described.

The float D is constructed of light material, so as to always rest on the surface of the water, because if the float were constructed of heavy material it would barely remain on the surface and the waves would pass over it; but being light and buoyant it glides over the waves with facility.

The well K, previously referred to, is connected with the main water-body by a subterranean pipe L, which keeps the water in the well at the proper height during the rise and fall of the tides. By this arrangement the float-weight $j$ will always rest on tide-water, and thereby adjust the float D, so it will always ride the water-surface, as will be clearly understood from the drawings.

From the foregoing it will be seen that as the float D moves outward the cable F will be drawn out with it, and thereby causing the drum on the windlass-shaft to revolve, and as the float moves inward the weight on the inner end of the cable will take up the slack of same and cause the drum to revolve in a reverse direction. To utilize this backward-and-forward revolution of the drum and to impart a continuous motion to the windlass-shaft, I construct the windlass substantially in the manner shown most clearly in Figs. 2, 3, 4, and 5 of the drawings.

Referring to said figures, M denotes the power-shaft, which is mounted in suitable standards *m m*. Fixedly secured to said shaft is a drum N, which is provided on its side faces with ratchet-teeth *n*, as shown.

O indicates a drum loosely mounted on the shaft M, which is provided with a series of spring-pawls *o o* on its inner face, which engage the ratchet-teeth *n* on the fixed drum.

P denotes a fly-wheel secured upon the outer end of the shaft.

In adjusting the cable F it is passed one or more times over the drum O and the weight attached to its free end. When the float operates back and forth, as described, the cable, when pulled outward, will, as before stated, revolve the loose drum outward. The pawls *o o* will then engage the fixed drum and cause it and the shaft to revolve in a forward direction. When the cable F is slack, the weight takes it up, and in doing so revolves the loose drum backward, the pawls *o* slipping over the ratchet-teeth *n* in a manner readily understood, the momentum of the fly-wheel keeping the shaft revolving in its forward direction during the backward revolution of the loose drum.

While I have described and shown but one float and its cable-connection in the drawings, it is manifest that two or more may be employed, each connecting with the windlass, that may be provided with additional loose pulleys, which when employed are arranged as shown in the drawings, in which O' indicates a second loose drum provided with pawls to engage the fixed drum, as shown. It will also be understood that while I may prefer to connect the float to a chain anchored and connected as described, I do not limit myself to the said means, as the float may be held in place in any desired manner. In case the work intended for the motor is too great, the first manifestation of it would be the submerging of the float. The greater the power to be obtained the more buoyant must be the floats and the greater amount of water must they be capable of displacing.

My invention will be found very useful on the ocean's beach, at summer-resorts, for driving machinery, &c.

While I use weights for taking up the slack in the cables, I do not confine myself to this method, as the same can be accomplished by the use of suitable springs.

Having thus described my invention, what I claim, and desire to secure by Letters Patent, is—

1. As an improvement in wave-motors, a float D, having a connection beneath the water's surface, said connection consisting of a cable connected to and depending from the float D, passed over a pulley *b*, anchored as shown, the free end of said cable extended to the shore, said end provided with a float *j*, a well *k*, adapted to receive said float, and a tube connecting said well with the tide-water, whereby the connection of the float D is automatically adjusted in relation to the tides by the rise and fall of said tides, and a connection between said float and a motor on the shore, substantially as and for the purpose described.

2. As an improvement in wave-motors, the combination, with a chain or cable anchored in the water a suitable distance from shore, of a cable-section pivotally connected to said chain near its anchored end, a float secured to the upper end of said cable section, said float adapted to be vibrated in the arc of a circle on the surface of the waves, and a connection between the float and a windlass on the shore, substantially as shown and described.

3. The combination, with the fixed cable A, a pulley secured to the outer end thereof, of a cable, the forward end of which is passed under the said pulley, the rear end extended to the shore and passed over a pulley on a suitable frame, a weight secured to the said end, a float secured to the outer end of the said cable, a motor, and a connection between said motor and the float, all arranged substantially as shown and described.

4. In a wave-motor, the combination, with the float D, arranged to vibrate on the waves, substantially as and in the manner described, of the windlass E, consisting of a power-shaft, a drum fixed to said shaft provided with a ratchet-section on one of its faces, a drum loosely mounted on said shaft provided with pawls engaging the ratchet-section of the fixed drum, and a cable passed about said loose drum provided with a weight at its inner end, the forward end connected to the float, all arranged to operate substantially as and in the manner before described.

ROBERT BALLARD DAVY.

Witnesses:
   J. A. DILLAR,
   F. R. STRONG.